US009103931B2

(12) United States Patent
Meinherz et al.

(10) Patent No.: US 9,103,931 B2
(45) Date of Patent: Aug. 11, 2015

(54) MODULAR LIGHT CURTAIN AND OPTICAL UNIT FOR A LIGHT CURTAIN

(75) Inventors: Carl Meinherz, Malans (CH); Martin Hardegger, Sargans (CH)

(73) Assignee: CEDES SAFETY & AUTOMATION AG, Landquart (CH)

( * ) Notice: Subject to any disclaimer, the term of this patent is extended or adjusted under 35 U.S.C. 154(b) by 451 days.

(21) Appl. No.: 13/444,329

(22) Filed: Apr. 11, 2012

(65) Prior Publication Data

US 2012/0267516 A1    Oct. 25, 2012

(30) Foreign Application Priority Data

Apr. 13, 2011  (EP) .................................. 11162263

(51) Int. Cl.
| | | |
|---|---|---|
| H01J 40/14 | (2006.01) | |
| G01V 8/20 | (2006.01) | |
| G01V 8/10 | (2006.01) | |

(52) U.S. Cl.
CPC ... G01V 8/20 (2013.01); G01V 8/10 (2013.01)

(58) Field of Classification Search
CPC ............. G01V 8/10; G01V 8/20; F16P 3/144; G08B 13/18; G08B 13/183
USPC ......... 250/221, 222.1, 222.2, 208.2; 340/555, 340/556, 557
See application file for complete search history.

(56) References Cited

U.S. PATENT DOCUMENTS

| | | | | |
|---|---|---|---|---|
| 5,281,809 A | * | 1/1994 | Anderson et al. | 250/221 |
| 7,511,615 B2 | * | 3/2009 | Shahar | 340/555 |
| 2007/0200699 A1 | * | 8/2007 | Rohbeck | 340/555 |
| 2010/0127158 A1 | * | 5/2010 | Scheiber et al. | 250/208.1 |

FOREIGN PATENT DOCUMENTS

| | | |
|---|---|---|
| DE | 19831493 A1 | 2/2000 |
| EP | 0889332 A1 | 1/1999 |
| EP | 1870734 A1 | 12/2007 |
| EP | 2009523 A1 | 12/2008 |
| EP | 2180348 A1 | 4/2010 |
| WO | 2008138598 A1 | 11/2008 |

OTHER PUBLICATIONS

EP Search Report; Applicant, Cedes Safety & Automation AG; Application No. EP 11162263.5.

* cited by examiner

*Primary Examiner* — Kevin Pyo
(74) *Attorney, Agent, or Firm* — Boyle Fredrickson, S.C.

(57) ABSTRACT

The present invention relates to a light curtain that comprises at least one first optical unit having a plurality of light emitting elements and light receiving elements and at least one second optical unit having a plurality of light emitting elements and light receiving elements, wherein said light emitting elements and light receiving elements are operable to form a light grid from a plurality of light barriers formed between opposing light emitting elements and light receiving elements. The first and second optical unit each comprise a transceiver unit carrying said plurality of light emitting elements and light receiving elements, and at least one separate detachable plug-in module, said first and second transceiver units being identically built and said first and second plug-in modules differing from each other in order to define the functionality of the first optical unit and the second optical unit, respectively.

22 Claims, 7 Drawing Sheets

MODULAR LIGHT CURTAIN AND OPTICAL UNIT FOR A LIGHT CURTAIN

CROSS-REFERENCE TO RELATED APPLICATION

This application is based upon and claims priority of European Patent Application No. EP11162263.5, filed on Apr. 13, 2011, the contents being incorporated herein by reference.

BACKGROUND OF THE INVENTION

The present invention relates to light curtains, in particular safety light curtains, for monitoring, a protective field. Furthermore, the present invention relates to optical units which are part of such a light curtain.

Generally, light curtains detect the movement or intrusion of objects into guarded zones, and more particularly, provide protection for human operators who are working with machines or other industrial equipment.

Light curtains employing infrared or visible light beams are used to provide operator safety in a variety of industrial applications. Light curtains typically are employed for operator protection around machinery, such as punch presses, brakes, molding machines, automatic assembly equipment, coil winding machinery, robot operation, casting operations and the like. Conventional light curtains typically employ light emitting diodes (LED) mounted at spaced positions along a transmitter bar at one side of the guard zone and phototransistors (PT), photodiodes or photoreceivers mounted along a receiver bar at the opposite side of the zone. The LEDs transmit modulated infrared light beams along separate parallel channels to the PTs at the receiver bar. If one or more beams are blocked from, penetration by an opaque object, such as the operator's arm, a control circuit either shuts the machine down, prevents the machine from cycling, or otherwise safeguards the area.

Usually, safety light curtains comprise two optical units (called bars, sticks, or strips), which are formed as two different constructional units, one of the optical units having the functionality of an emitter and one of a receiver. This dedicated architecture of an emitter and receiver, however, has several drawbacks.

Firstly, the fabrication costs are high, because each type of optical unit has to be fabricated differently. Further, due to the fact that the optical communication is only unidirectional, i.e. from the sender to the receiver, the optical synchronization may be difficult and a transmission of communication information is possible only in one direction.

Secondly, when using the light emitting elements of the sender optical unit for performing an alignment of the light curtain, the accuracy is not satisfactory, as only half of the system can be aligned by using this scheme. It is known therefore, to use a separate alignment light source, for instance a laser, as this is explained in the European patent 0889332. However, the use of such an integrated laser alignment system adds complexity and costs to the manufacturing of the optical units.

It has already been proposed to locate receivers and transmitters on each of the first and second optical units, as this is described in the European patent EP 1870734. Here, the grid has two identical transmitting/receiving strips, to which transmitting and receiving units are fixed. The transmitting/receiving strips are placed opposite to each other with a protective field being formed between the strips. The transmitting/receiving strips are identically formed in control and evaluation units. The control and evaluation units have safety outputs, which are formed together as a switching channel. An identical power supply is provided for all the strips. However, due to the fact that the known transmission/reception bars are constructed identically and also operate identically, synchronization is a particularly difficult issue.

Furthermore, due to the significant architectural differences to established systems with separate receiver and sender bars, the combined receiver/transmitter units according to EP 1870734 cannot be used for retrofitting or updating existing light curtains.

Moreover, the system according to EP 1870734 also has the disadvantage that it can only provide a single channel communication, whereas for many applications a dual channel configuration is required.

Furthermore, it is known to provide an additional communication channel for providing a bidirectional communication. As the synchronization algorithm takes a long time to achieve synchronization with only a unidirectional optic, it is known to use alternatively a connection cable and synchronize the sticks electrically.

SUMMARY OF THE INVENTION

The object underlying the present invention is to provide a light curtain and an optical unit for a light curtain, which, can be fabricated in a particularly cost-effective way, allow for an accurate alignment and synchronization and is compatible with existing light curtain assemblies.

This object is solved by the subject matter of the independent claims. Advantageous embodiments of the present invention are the subject matter of the dependent claims.

According to the present invention, each optical unit has a transceiver unit carrying a plurality of light emitting elements and light receiving elements and at least one separate detachable plug-in module. The first and second transceiver units are identically built, whereas the first and second plug-in modules differ from each other and thus define the functionality of the respective optical unit. For instance, the plug-in module differentiates an optical unit as the emitter with, for instance, the test input or as the receiver with, for instance, the output signal switching devices, OSSD.

The modular architecture according to the present invention allows a very cost-effective fabrication, because the transceiver modules are identically built and on the other hand, can be applied in a very flexible way for a multitude of architectures.

According to an advantageous embodiment, the light curtain produces a defined output signal upon interruption of at least one light barrier, which is a safety signal. However, it is clear for a person skilled in the art that the principles according to the present invention can also be applied for light curtains, which are not used in safety applications or for a sensing light curtain.

According to the present invention, the first and second optical unit communicate with the control unit in a redundant dual channel configuration, thus fulfilling the requirements for electrosensitive protective equipment as defined for instance in IEC 61496-1 and 2, edition 2.1, 2008-01.

The plug-in according to the present invention are separately housed detachable units, which can provide a large variety of functions to the optical unit. In particular, the plug-in module may define sender functionality and may comprise at least one general purpose input/output terminal, GPIO. Alternatively, the plug-in module may define receiver functionality and comprises at least one output signal switching device, OSSD, for causing a control unit to output a safety signal upon interruption of at least one light barrier. Additionally, this plug-in module may comprise a machine primary control element/external device monitoring terminal (MPCE/EDM).

A particularly effective way to implement a transceiver unit is to provide a plurality of separate transceiver elements, each comprising at least one light emitting element and at least one light receiving (or detecting) element. The light emitting element may for instance be a light emitting diode, LED.

According to an advantageous embodiment, this light emitting element comprises a total internal reflection (TIR) unit for generating a defined and directed light beam.

According to an advantageous embodiment, the emitted light is visible light, in particular red light, having a wavelength between about 620 nm and 750 nm. The use of visible light allows fulfilling eye safety requirements much easier than when using infrared light. Furthermore, LEDs with visible emitted light can also be used for displaying status information to a user. This is particularly important when performing an alignment of the light curtain, but also when providing the possibility of a muting or blanking during operation.

In order to reduce the influences of noise and interferences, each transceiver element may be provided with its own electronic circuit for driving the light emitting element and for pre-processing the signals generated by the light detecting elements. This electronic circuit is preferably implemented in the form of an application specific integrated circuit, ASIC.

In order to further reduce the cost, instead of using the same number of emitters and receivers, the cheaper one of them can be used more often than the other. For instance, the light emitting elements can be twice as many as the light receiving elements.

The fact that each optical unit has transmitters as well as receivers mounted thereon opens the possibility of implementing a bidirectional communication between these units for transmitting information optically.

The optical units according to the present invention do not necessarily have only one plug-in module each, but may also be equipped with a second plug-in module. When providing top and bottom plug-in modules at the optical units, also complex cascaded architectures can be designed.

BRIEF DESCRIPTION OF THE DRAWINGS

The accompanying drawings are incorporated into and form a part of the specification to illustrate several embodiments of the present invention. These drawings together with the description serve to explain the principles of the invention. The drawings are merely for the purpose of illustrating the preferred and alternative examples of how the invention can be made and used, and are not to be construed as limiting the invention to only the illustrated and described embodiments. Furthermore, several aspects of the embodiments may form—individually or in different combinations—solutions according to the present invention. Further features and, advantages will become apparent from the following more particular description of the various embodiments of the invention, as illustrated in the accompanying drawings, in which like references refer to like elements, and wherein.

DETAILED DESCRIPTION OF THE PREFERRED EMBODIMENT

Figure 1:
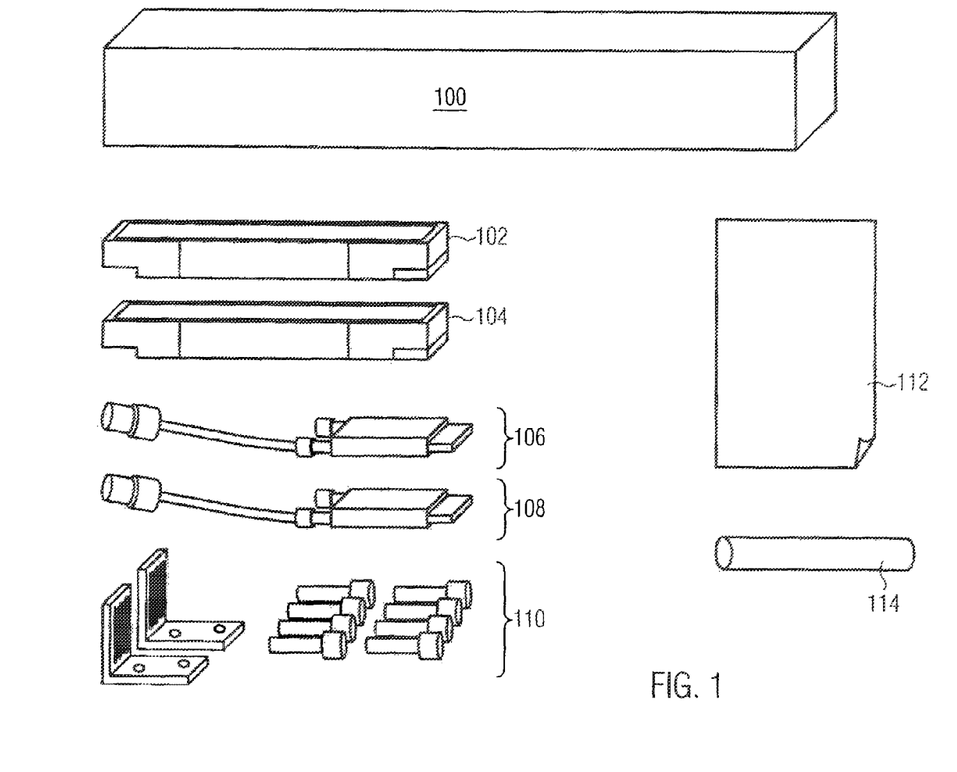
FIG. 1 shows a schematic representation of a light curtain kit comprising two optical units according to the present invention.

Referring to FIG. 1, a light curtain assembly kit 100 is shown schematically. According to the present invention, two identical transceiver units 102, 104 are provided, which both have a plurality of light emitting units and light receiving units arranged thereon. Each of these transceiver units 102, 104 in itself needs an additional plug-in unit 106 or 108 to form a complete ready-to-operate optical unit. The first plug-in module 106 may define a sender functionality and comprise a general purpose input/output, GPIO.

On the other hand, the second plug-in module 108 may for instance be a module that contains the output signal switching devices, OSSD, thus defining the combination of one transceiver unit 102 with the respective plug-in module as a receiver unit.

As shown in FIG. 1, the plug in modules 106, 108 may be fixed at transceiver units 102, 104 by means of screws. However, also snap fit connections or any other suitable fixing means can be employed for securing the plug-in modules at the transceiver unit.

A set of mounting brackets 110 is provided for fixing the assembled optical units at the protected field to be monitored. Installation instructions 112 and a standardized test rod 114 complete the light curtain assembly kit 100.

According to the present invention, identical transceiver units 102, 104, which also may be referred to as sticks, are differentiated in their functionality by means of the associated plug-ins 106, 108. As each transceiver unit comprises light emitters as well as receivers, as this will be apparent from the following figures, a bidirectional optical communication between the two transceiver units is feasible. Furthermore, due to the bidirectional communication, the optic synchronization is simplified.

The light curtain assembly kit 100 can be used to replace older classic light curtains; the alignment of the optical units with respect to each other can be done without extra aid, if using red light emitters as the light emitting device.

As all the transceiver units are identical, their pre-assembly during the fabrication processes is identical and the differentiation into a sender or a receiver optical unit is done by the plug-in units 106, 108, which are small and cheap and can be handled by the user. Furthermore, the replacement storage is facilitated, because only one transceiver module is needed. Finally, the production costs are reduced due to the higher part volumes.

Figure 2:
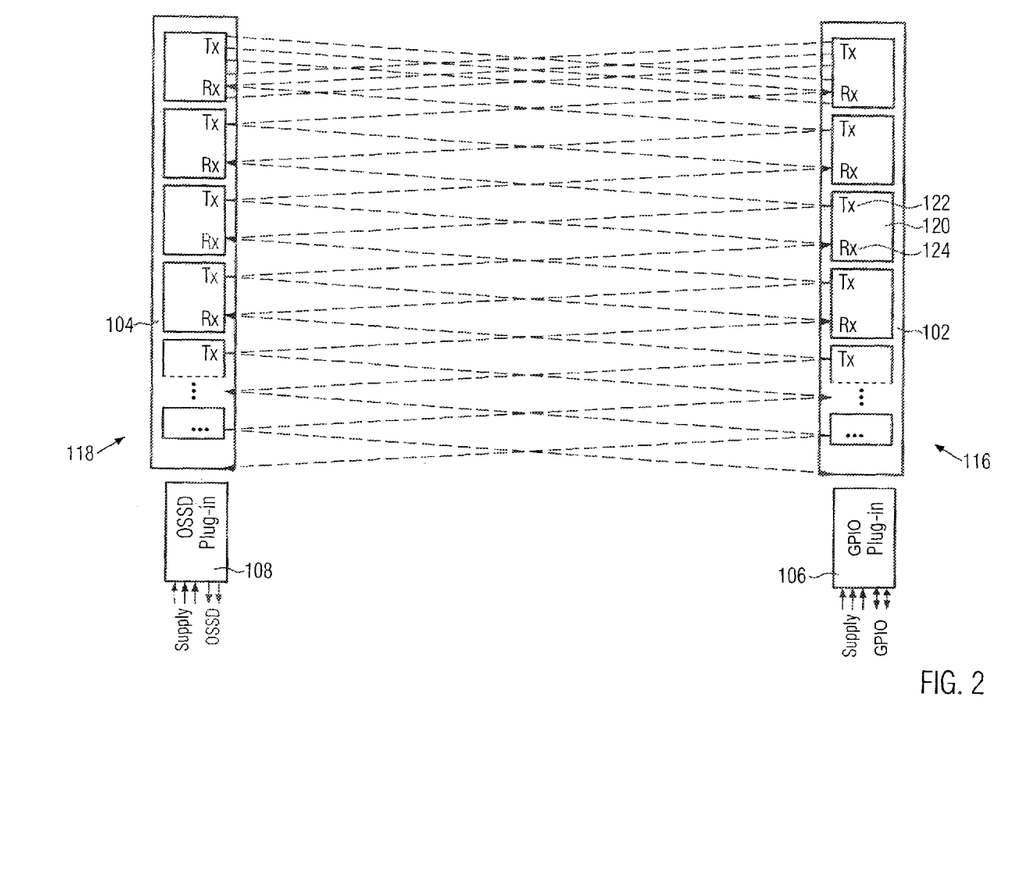
FIG. 2 shows a block diagram of a light curtain with modular optical units for safety applications.

FIG. 2 shows schematically an exemplary embodiment of a safety light curtain according to the present invention. In this embodiment, the light curtain is formed by two optical units 116, 118. Each of the first and second optical units 116, 118 comprises an identical transceiver unit 102, 104. For differentiating the first optical unit 116 as a sender unit, same comprises a plug-in module 106, which is equipped with general purpose input/output (GPIO) terminals.

That means that the optical unit 116 in the configuration shown in FIG. 2 can be used for replacing a sender stick as commonly available on the market. On the other hand, the second optical unit 118 is defined in its functionality as a receiver unit, which has the OSSD terminal at the second plug-in module 108.

Figure 3:
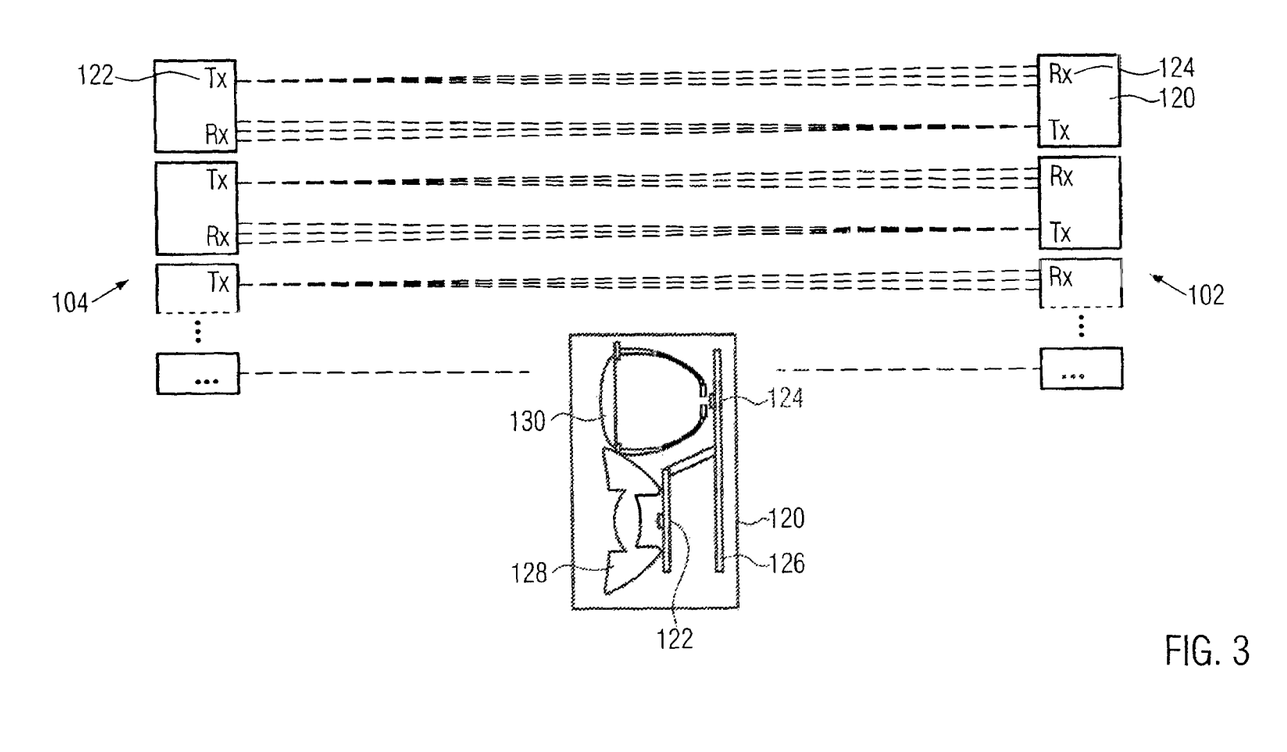
FIG. 3 shows a schematic representation of two interacting transceiver units.

Each of the transceiver units 102, 104 according to the present invention comprises a plurality of transceiver elements 120, which are shown in more detail in FIG. 3. In the particular embodiment of FIG. 2, each transceiver element 120 comprises one light emitting element 122, which is designated as the transmitter Tx, and one light detecting element 124, marked as receiving element Rx. According to the present invention, each light emitting element 122 emits visible light, in particular red light with a wavelength range of 620 nm to 750 nm. By using visible light, the optical units 116, 118 can easily be aligned by looking at same from the opposite side. In contrast to most conventional light curtains, where infrared light is used for the emitters, the alignment can be performed without additional costs and furthermore, can much more easily fulfill the eye protection requirements.

In FIG. 2 several exemplary measures are given for the distances of the transceiver elements and of the individual light beams. According to this arrangement, the two transceiver units 102, 104 have the same orientation, that means that always light emitting devices and light detecting devices are directly opposite to each other. The light emitters are oriented in a way that a linear cascading is established between the senders and the receivers.

FIG. 3 shows an alternative embodiment, where the first and second transceiver units 102, 104 are oriented in a way that always a light emitting element 122 is arranged directly opposite a light detecting element 124. The transceiver element 120 is shown as a detail. Each transceiver element 120 according to the present invention comprises a substrate 126 carrying one light emitting diode 122 and one photodiode as a light detecting element 124.

In order to generate a directed light beam, the light emitting element 122 comprises a total internal reflection (TIR) device. The light detecting element 124 is provided with a lens optic and a parabolic reflector 130 for bundling the incoming light on the sensing surface of the light detecting element 124.

The TIR optic is a secondary optic for high-power LEDs. This optic combines a central lens with a totally reflecting mirror for collimating the light into a parallel beam. According to the present invention, each transceiver element 120 combines the light emitting element 122 and the light detecting 124 with their optics 128 and 130 on a common substrate 126, which may also carry the electronic circuits which are necessary for driving the LED and pre-processing the signals from the photo detector.

When using red light emitters as the light emitting elements 122, the emitters simultaneously can be used for display and sensing. Furthermore, the red light emitters may be additionally used for the alignment during insulation. Moreover, red light emitters and receivers are much more cost-efficient than infrared sensors and senders. Both optics may be integrated as one housing component. Thus, the costs for fabricating the transceiver elements 120 may be reduced.

By using different optics for the emitter and the receiver, on the one hand a coupling with high efficiency can be achieved for the emitter by using the total internal reflection and on the other hand, a large lens area can be chosen for the receiver, thus allowing a high optic power to arrive on the sensitive area.

By adjusting the emitting power, the effective aperture angle (EAA) can be adapted. By operating the light emitting elements close to the detection limit, erroneous reflections are detectable. Furthermore, as no receiver overdrive can occur, the response time is faster. The TIR optics for the emitters in each optical unit lead to a small optic volume, thereby leaving space on the printed circuit board, which can be used for displays, communication elements, operating and control elements and also an additional laser alignment unit.

Figure 4:
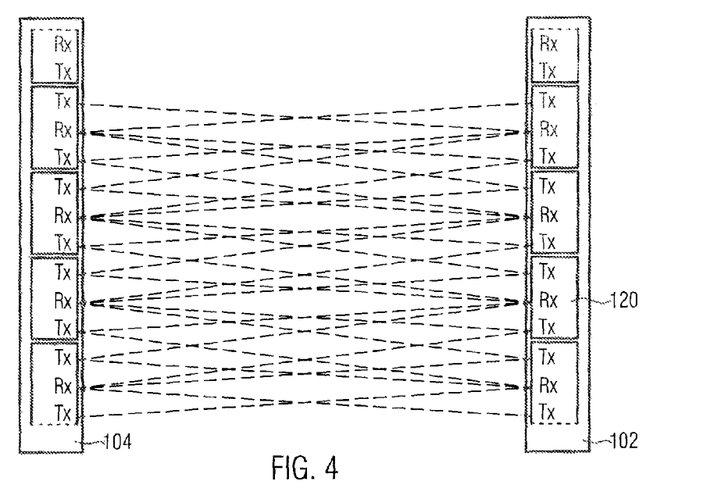
FIG. 4 shows an alternative embodiment of the transceiver units.
Figure 5:
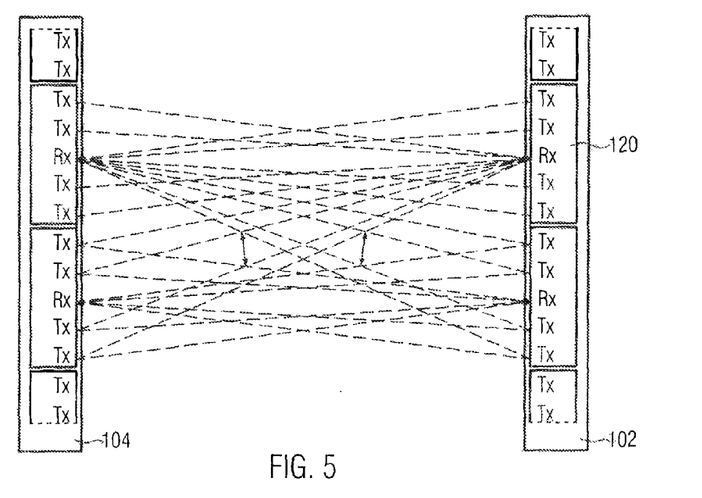
FIG. 5 shows still another embodiment of two transceiver units.

Of course, the transceiver element 120 does not necessarily have to be restricted to a case with only one light emitting element 122 and one light detecting element 124. As shown in FIGS. 4 and 5, for instance two or four light emitting elements may be combined with only one light detecting element 124. However, also any other suitable combination may be chosen for the transceiver element 120. By using crossed beams, the resolution can be maintained over the complete length of the light curtain. In FIG. 5 four times as many emitters as receivers are used. Here more than two crossed beams have to be employed per emitter. The critical resolution locations are marked with arrows in FIG. 5.

Figure 6:
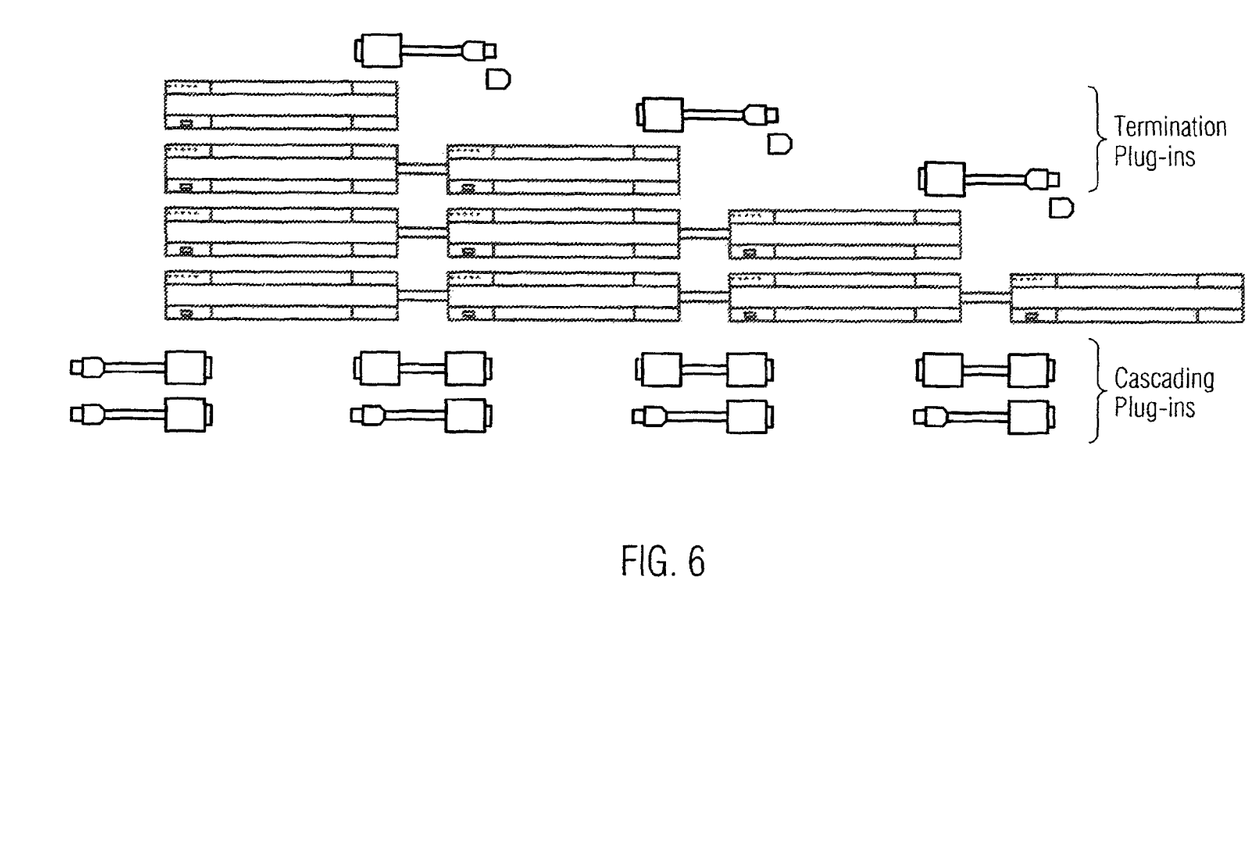
FIG. 6 shows a schematic representation of a light curtain kit with a plurality of cascaded optical units.

Up to now always only one plug-in module for each optical unit was shown. However, the present invention can be extended to cases where more than one plug-in module is used in order to enhance the functionalities of each optical unit. By using plug-in units at two ends ("top" and "bottom") of each optical unit, also cascaded architectures can be built, as this is shown schematically in FIG. 6, where up to four optical units are connected in series in order to cover a larger area to be monitored. Furthermore, an emergency shutdown can directly be connected via the top plug-in module.

Figure 7:
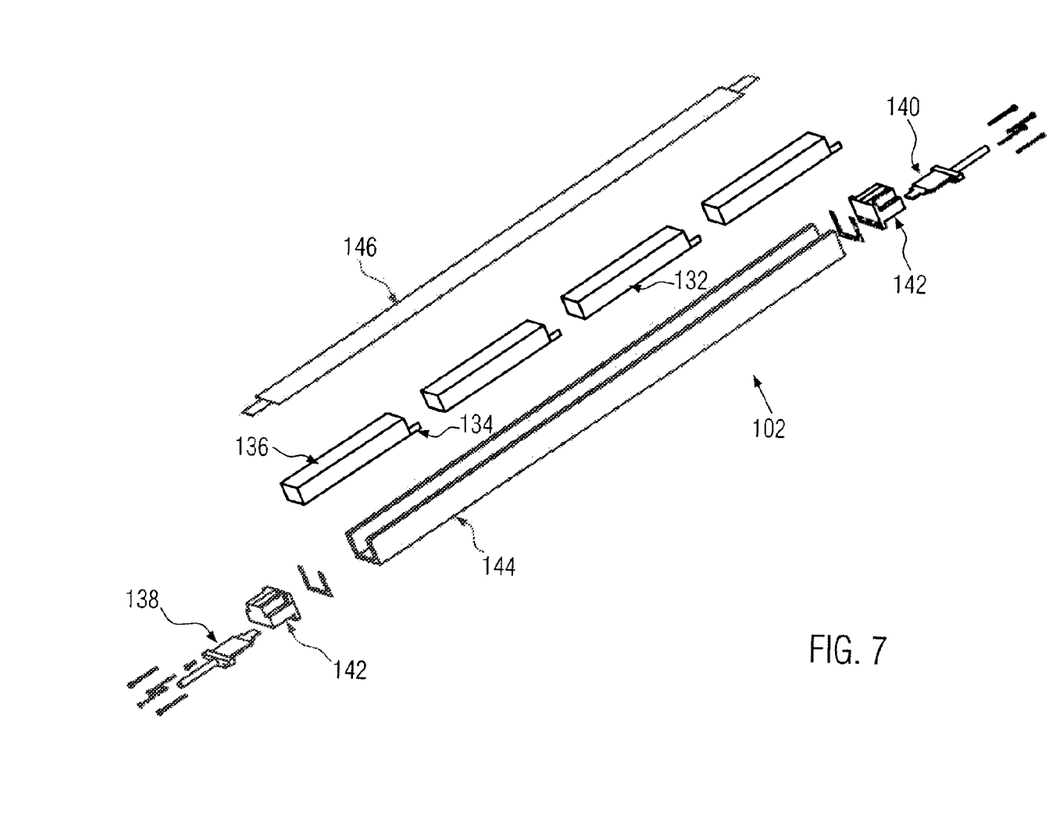
FIG. 7 shows an exploded view of an optical unit comprising several transceiver modules and two plug-in modules.

FIG. 7 shows an exploded view of an optical unit 116 or 118, according to a further embodiment. The optical unit is designed in a more complex way than the ones shown in FIG. 1, but again the modular character leads to a high flexibility for the user.

According to this embodiment, the transceiver unit 102 comprises several transceiver modules 132, carrying a plurality of transceiver elements according to the previous figures. For connecting the transceiver modules 132 to each other, an interconnection 134 is provided. The controller module 136 comprises a controller unit with microcontrollers incorporated therein.

According to the present invention, two plug-in modules are provided, a bottom plug-in module 138 and a top plug-in module 140. End caps 142 are provided at two ends of an aluminum extrusion profile 144 to accommodate the plug-in modules 138 and 140. A transparent front window 146 protects the transceiver modules 132 from dust and humidity. Depending on what type of plug-in modules 138, 140 is inserted, the transceiver unit 102, 104 is functionalized as a sender or receiver optical unit, respectively. Thus, safety light curtains can be produced in a particularly cost-effective way.

Figure 8:
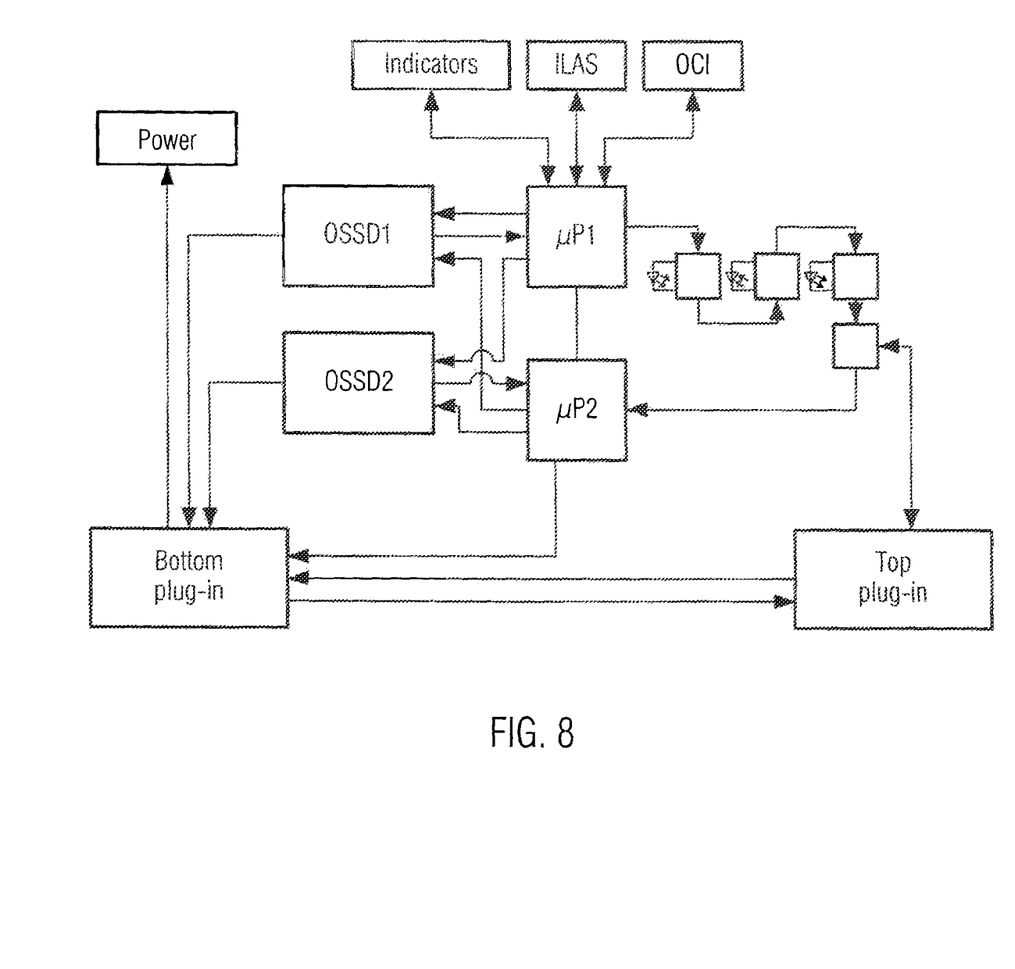
FIG. 8 shows a block diagram of the internal architecture of a light curtain according to the present invention.

FIG. 8 shows as an example the internal structure of an optical unit according to the present invention, which is functionalized at a receiver unit with two OSSD outputs. In order to provide the necessary redundancy, two microprocessors µP1, µP2 are provided and the internal communication paths are in a dual channel configuration.

In addition, an optical communication interface OCI can be provided, which allow the communication via the optical path and from the optical unit to a computer or the like.

Functionalities like blanking, muting or beam coding can also be incorporated by means of a respective plug-in module according to the present invention.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those embodiments may become apparent to those of ordinary skill in the art upon reading the foregoing description. The inventor(s) expect skilled artisans to employ such variations as appropriate, and the inventor(s) intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What we claim is:

1. A light curtain for monitoring a protective field, said light curtain comprising:
   at least one first optical unit having a plurality of light emitting elements and light receiving elements and at least one second optical unit having a plurality of light emitting elements and light receiving elements, wherein said light emitting elements of each optical unit are operable to form a plurality of light barriers with opposing light receiving elements of the respective other optical unit,
   a control unit for processing output signals generated by said light receiving element and for generating a defined output signal upon interruption of at least one light barrier,
   wherein said first and second optical unit each comprise a transceiver unit carrying said plurality of light emitting elements and light receiving elements, said first and second transceiver units having an identical structure, and
   wherein each optical unit has at least one separately housed, detachable plug-in module, said first and second plug-in modules differing regarding their functionality and terminals from each other and defining the functionality of the first optical unit and the second optical unit, respectively.

2. A light curtain according to claim 1, wherein said defined output signal generated upon interruption of at least one light barrier is a safety signal.

3. A light curtain according to claim 2, wherein said first plug-in module is defining a sender functionality and comprises at least one general purpose input/output, GPIO, terminal.

4. A light curtain according to claim 3, wherein said second plug-in module is defining a receiver functionality and comprises at least one output signal switching device, OSSD, for causing said control unit to output a safety signal upon interruption of at least one light barrier.

5. A light curtain according to claim 4, wherein the OSSD outputs said safety signal in a redundant dual channel configuration.

6. A light curtain according to claim 5, wherein said second plug-in module comprises a machine primary control element/external device monitoring, MPCE/EDM, terminal.

7. A light curtain according claim 1, wherein said transceiver units each comprise a plurality of transceiver elements, each comprising at least one light emitting element and at least one light receiving element.

8. A light curtain according to claim 7, wherein said light emitting element comprises a total internal reflection, TIR, unit for generating an aligned light beam.

9. A light curtain according to claim 1, wherein each of said transceiver units is operable to send light to the respective other transceiver unit.

10. A light curtain according to claim 9, wherein the emitted light is visible light.

11. A light curtain according to claim 10, wherein at least one of said light emitting elements is further operable to display status information to a user.

12. A light curtain according to claim 11, wherein each transceiver element comprises an electronic circuit for driving said light emitting elements and for processing signals generated by said light receiving elements.

13. A light curtain according to claim 12, wherein, for each transceiver element, the number of light emitting elements and the number of light receiving elements differs from each other.

14. A light curtain according to claim 13, wherein said light emitting elements comprise at least one light emitting diode, LED.

15. A light curtain according to claim 12, wherein at least a part of the light emitting units and light receiving units are operable to transmit communication signals between said first and second optical unit.

16. A light curtain according to claim 15, wherein at least a part of the plurality of first and second light emitting units and/or first light receiving units are operable to generate alignment light beams between each other, and wherein said control unit is operable to evaluate the output signals of the light receiving units corresponding to said alignment light beams in order to support a mechanical alignment of said first and second optical units with respect to each other.

17. A light curtain according to claim 16, wherein at least one of the plug-in modules is adapted to be connected to a safety device.

18. A light curtain according to claim 16, wherein at least one plug-in module is configured to connect two optical units to form a cascaded architecture.

19. An optical unit for a light curtain, said optical unit comprising:
   a plurality of light emitting elements and light receiving elements, wherein the light emitting elements and light receiving elements of the optical unit are operable to form a light grid with corresponding light emitting elements and light receiving elements of an opposing second optical unit,
   wherein said optical unit further comprises a transceiver unit carrying said plurality of light emitting elements and light receiving elements, and at least one separately housed, detachable plug-in module, said plug-in module differing regarding its functionality and terminals for the first and second optical unit and being configured to define the functionality of the optical unit.

20. A light curtain according to claim 9, wherein the emitted light is red light having a wavelength between about 620 nm and 750 nm.

21. A light curtain according to claim 16, wherein at least one of the plug-in modules is adapted to be connected to an emergency stop.

22. A plug-in module for an optical unit for a light curtain, the optical unit including a plurality of light emitting elements and light receiving elements, wherein the light emitting elements and light receiving elements of the optical unit are operable to form a light grid with corresponding light emitting elements and light receiving elements of an opposing second optical unit, and wherein said optical unit further comprises a transceiver unit carrying said plurality of light emitting elements and light receiving elements, the plug-in module comprising:

a separately housed, detachable module configured to define a functionality of the optical unit, wherein the module differs in its functionality and terminals from a plug-in module configured to define the second optical unit.

* * * * *